United States Patent Office 3,188,132
Patented June 8, 1965

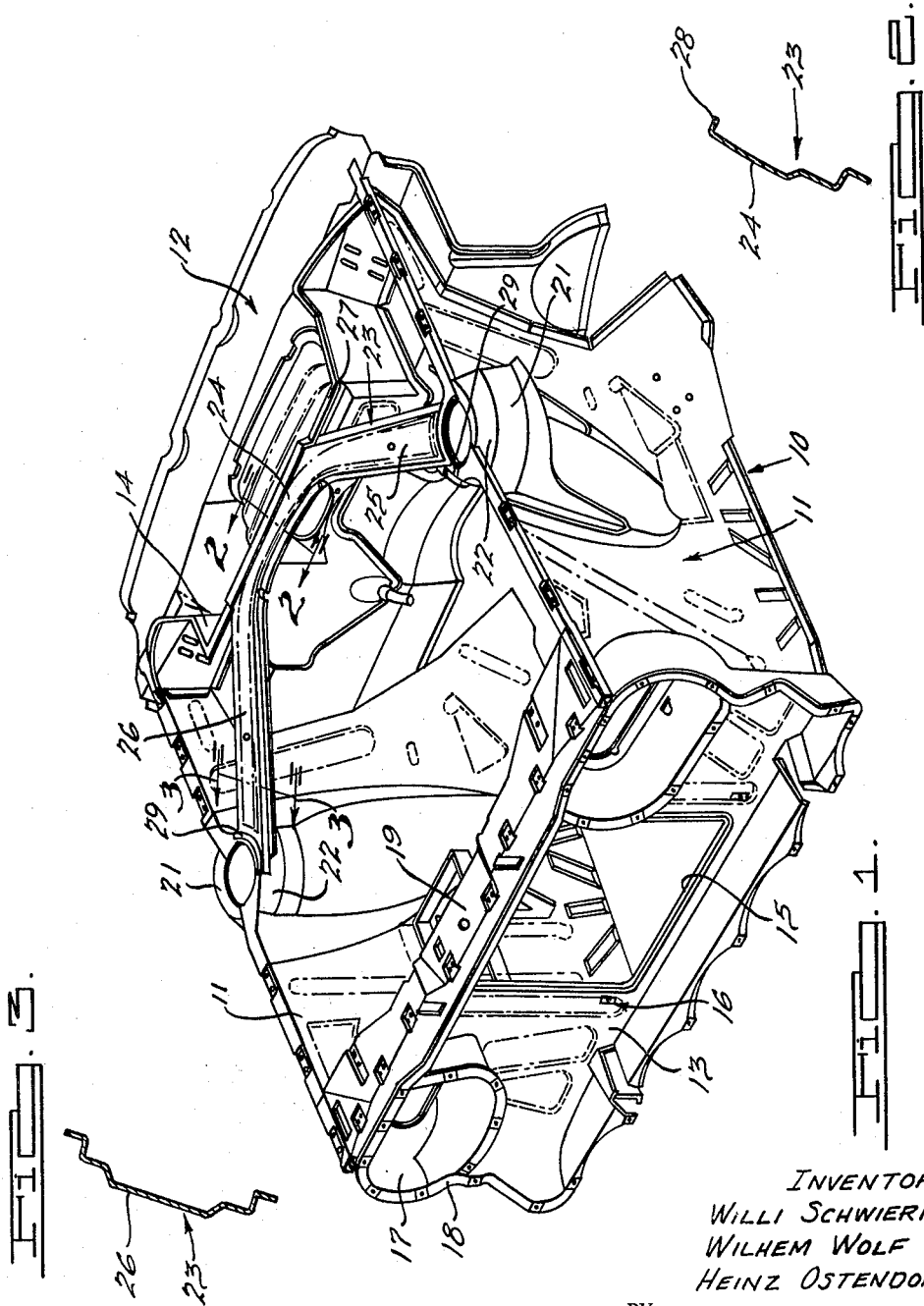

3,188,132
MOTOR VEHICLE FRONT END STRUCTURE
Willi Schwiering, Wilhelm Wolf, and Heinz Ostendorf, Cologne, Germany, assignors to Ford Motor Company, Dearborn, Mich., a corporation of Delaware
Continuation of abandoned application Ser. No. 184,620, Feb. 14, 1962. This application July 16, 1964, Ser. No. 390,498
2 Claims. (Cl. 296—28)

This invention relates to a motor vehicle front end structure and more particularly to means for reinforcing the front end structures of self-supporting or partially self-supporting vehicle bodies having independent front wheel suspension systems.

This application is a continuation of application Serial Number 184,620, filed February 14, 1962, and now abandoned.

It is extremely difficult, with respect to self or partially self-supported vehicle bodies, to direct the suspension system jounce forces into the vehicle body in a manner effective to minimize twisting or bending effects. Self-supporting vehicle bodies do not have conventional frame structures on which the suspension system spring or its attaching means can be supported. Though the front end structure is usually provided with a reinforced structural member for supporting the engine, it is not possible to support the spring attachment means on this reinforced structural member, especially if the front wheel suspension system is of the type having a single transverse control arm. Moreover, the spring journal or attachment means is usually supported in the upper portion of a spring housing or spring tower built into the fender apron or wheel housing near an upper edge of the front end structure.

It is an object of the present invention to provide an improved brace structure capable of directing the front axle jounce forces through the spring housing and apron wall into the engine compartment, thus preventing dangerous bending moments.

It is conventional to arrange braces or struts from the spring housing or attachment means supports to the cowl structure of a vehicle body. It is also conventional to connect the journal or attachment means support, the upper corner of a side panel, the side wall or apron, and the cowl structure by a triangular or box channel-shaped welded-in bracket. These supports, however, are not capable of receiving or absorbing jounce forces of higher degrees. Therefore, the jounce has to be limited by bumpers at the reinforced lower part of the engine compartment.

It is, therefore, a further object of the present invention to provide an undetachable connection between the spring housings or spring towers on the opposite fender aprons, the connection comprising a yoke capable of absorbing high degree jounce forces. The yoke consists of a base part and two laterally and forwardly diverging brackets, the base part being fastened to the cowl structure or to the front wall of an air chamber formed in the cowl structure. The yoke is formed of pressed sheet metal and is substantially U-shaped in cross section. The base of the yoke is spot welded through a single lateral flange to the cowl structure or air chamber flange. The end portions of the yoke are securely spot welded to the upper surfaces of the respective spring housings or spring towers.

The yoke is built with a sufficient rigidity to make jounce bumpers unnecessary. The yoke does not interfere with access to the engine. The jounce forces will be centrally received by the engine compartment of the car body. Forces acting unilaterally or bilaterally are balanced thereby preventing any unusual deformation of the car body.

Other objects and advantages of the present invention will become more apparent as this description proceeds, particularly when considered in connection with the accompanying drawing, in which:

FIG. 1 is a perspective view of a front end assembly of a vehicle body with the brace structure according to the present invention;

FIG. 2 is a sectional view taken along the line 2—2 of FIG. 1; and

FIG. 3 is a sectional view taken along the line 3—3 of FIG. 1.

Referring now to the drawing, reference numeral 10 generally designates the front end structure of a vehicle body. The front end structure comprises fender aprons 11 at the sides, a cowl structure 12 at the rear and a radiator support panel 13 at the front. A plenum chamber 14 is located forwardly of or above the cowl structure 12. The radiator support panel 13 comprises an opening 15 for air flow, radiator fastener receiving devices 16 and shell portions 17 of the headlight housings. The radiator support panel 13 has a peripheral flange 18 suitably apertured to receive fastener devices (not shown) for the headlights, fenders, front ornamentation and grille work. At its upper side the support panel 13 is provided with a transversely extending reinforcing element 19 weldably secured to the support panel and the fender aprons. The reinforcing element carries a part of the lock element for the engine compartment hood (not shown).

The fender aprons 11 have formed therein the suspension spring housings or spring towers 21, the latter being constructed to serve as journals for the attachment means carried on the suspension system springs (not shown). It will be noted that the cup-shaped upper ends 22 of the spring housings or spring towers 21 are located at the upper corner or edge of the fender aprons 11.

A yoke 23 consisting of a base portion 24, and left and right laterally and forwardly extending sections 25 and 26, respectively, is positioned so that the base portion 24 thereof is secured to the cowl structure 12 or more especially to a flange 27 of the plenum chamber 14. The base portion 24 of the yoke 23 is attached to the plenum chamber flange 27 only along its edge 28, see FIG. 2. The sections 25 and 26 extend to the opposite spring housings 21 and are securely welded to them by spot welding through flanges 29, respectively.

With the yoke base section being attached at only one edge thereof to the cowl structure, the unilateral jounce forces will only twist the yoke sections relative to one another while the cowl structure and vehicle body will remain relatively untwisted.

It will be noted from FIGS. 2 and 3 that the base section and extending sections are substantially U-shaped to attain the necessary rigidity. In addition, the surface is corrugated. The yoke may be spot welded at all connecting points. Manufacturing and assembly may, therefore, be effected in the most inexpensive manner.

It will be understood that the invention is not to be limited to the exact construction shown and described, but that various changes and modifications may be made without departing from the spirit and scope of the invention as defined in the appended claims.

We claim:
1. In a motor vehicle having an engine compartment defined by spaced fender aprons and a cowl structure extending therebetween at the rear thereof, said cowl structure having a forwardly extending flange thereon, each fender apron having a suspension system spring housing intermediate the ends thereof, a single bracing channel yoke member consisting of a base portion having a rear- wardly extending flange along one edge thereof and divergent forwardly extending arms, said yoke member flange being secured to said cowl flange to provide the only attachment of said yoke member base portion to said cowl structure, the free ends of said arms being secured to the spring housings, the longitudinal axis of each diverging section intersecting the plane of said cowl structure and the plane of the respective fender apron at an angle, said yoke being effective to transmit suspension system jounce forces from said spring housings to said cowl structure near the center thereof.

2. In a motor vehicle having an engine compartment defined by spaced fender aprons and a cowl structure extending therebetween at the rear thereof, said cowl structure having a forwardly extending flange thereon, each fender apron having a suspension system spring housing intermediate the ends thereof and adjacent the upper edges thereof, a single bracing channel yoke member consisting of a base portion having a rearwardly extending flange alone one edge thereof and divergent forwardly to said cowl flange to provide the only attachment of said extending arms, said yoke member flange being secured yoke member base portion to said cowl structure, said base portion being substantially shorter than said cowl structure and being located centrally thereon, the free ends of forwardly diverging arms being secured to the upper portion of said spring housings, the longitudinal axis of each diverging section interesecting the plane of said cowl structure and the plane of the respective fender apron at an angle, said base portion and arms being of corrugated U-shaped cross section, said yoke being effective to transmit suspension system jounce forces from said spring housings to said cowl structure near the center of the latter.

References Cited by the Examiner
UNITED STATES PATENTS 2,851,302  9/58  Owen _____ 296—28
2,955,870  10/60 Richards _____ 296—28

A. HARRY LEVY, *Primary Examiner.*